United States Patent [19]

Newing et al.

[11] Patent Number: 5,318,815
[45] Date of Patent: Jun. 7, 1994

[54] ABHERENT SURFACES

[75] Inventors: Charles W. Newing, San Gabriel, Calif.; Robert S. Dordick, Lyndhurst, Ohio; Adrian J. Hulme, Leiden, Netherlands; Erick R. Atkinson, Hannover Estate; Peter L. Emerson, Seatonburn, both of United Kingdom; Bert R. Potjer, Voorschoten, Netherlands

[73] Assignee: Avery Dennison Corporation, Pasadena, Calif.

[21] Appl. No.: 980,481

[22] Filed: Nov. 23, 1992

Related U.S. Application Data

[60] Division of Ser. No. 455,724, Dec. 22, 1989, Pat. No. 5,165,976, which is a continuation-in-part of Ser. No. 370,174, Jun. 22, 1989, abandoned.

[30] Foreign Application Priority Data

Jun. 25, 1988 [GB] United Kingdom ............... 88151626

[51] Int. Cl.⁵ .............................................. B32B 5/06
[52] U.S. Cl. ....................................... 428/40; 428/219; 428/327; 428/340; 428/341; 428/342; 428/343; 428/352; 428/447; 428/448; 428/449; 525/100; 525/104; 525/105
[58] Field of Search ................ 428/40, 219, 447, 449, 428/352, 343, 448, 323, 327, 340–342, 452; 524/861, 862; 427/387, 394; 525/104, 105, 100

[56] References Cited

U.S. PATENT DOCUMENTS

| | | | |
|---|---|---|---|
| 4,056,661 | 11/1977 | Sato | 428/354 |
| 4,433,007 | 2/1984 | Marwitz | 524/862 |
| 4,526,953 | 7/1985 | Dallavia | 524/862 |
| 4,859,511 | 8/1989 | Patterson | 428/40 |

Primary Examiner—Ellis P. Robinson
Assistant Examiner—Nasser Ahmad

[57] ABSTRACT

A substrate is provided with a release surface by application of an emulsion of a vinyl-addition silicone system and catalyst therefor and a particulate component, preferably a resin. The vinyl addition silicone system is cured upon application of heat and removal of water.

32 Claims, 4 Drawing Sheets

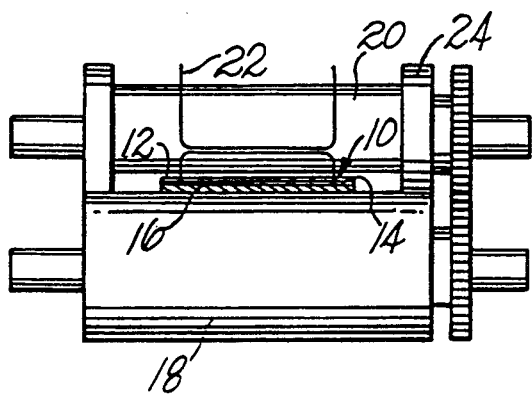
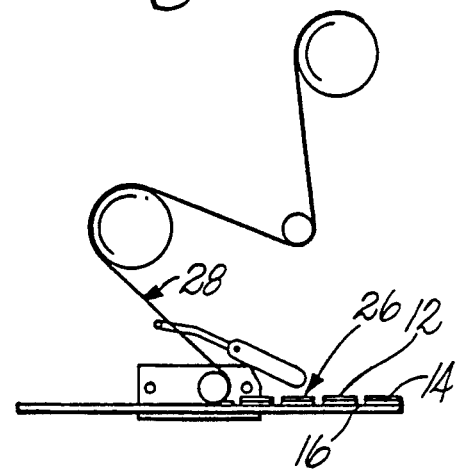
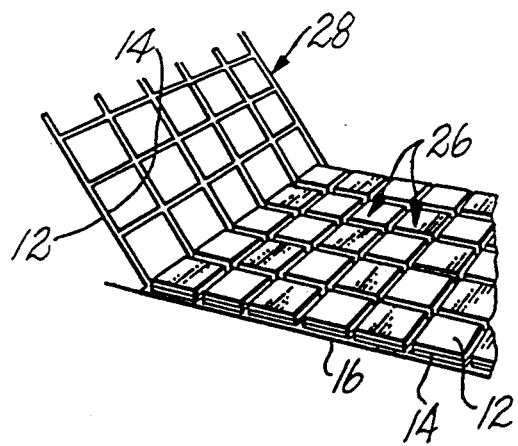

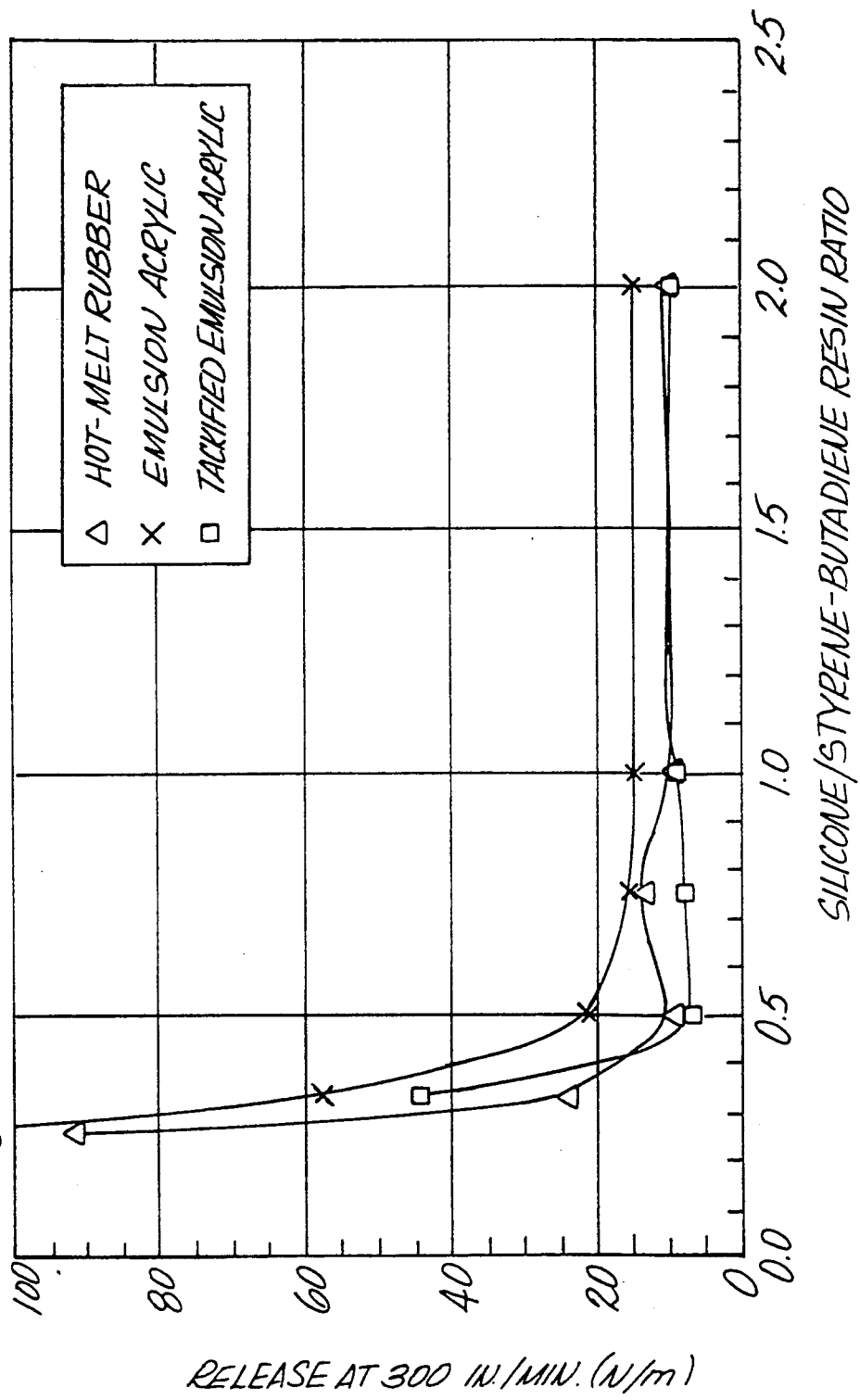

ABHERENT SURFACES

This application is a division of U.S. application Ser. No. 07/455,724, filed Dec. 22, 1989, now U.S. Pat. No. 5,165,976 which application was a continuation-in-part Ser. No. 07/370,174 filed Jun. 22, 1989 now abandoned.

BACKGROUND OF THE INVENTION

This invention relates to release surfaces utile for release liners and adhesive contacting release surfaces for self-wound tapes among other applications.

A major utility of the invention concerns an improved release liner (or backing) for use in combination with a pressure-sensitive adhesive layer and a face stock preferably for label applications. In such combinations, the release liner protects the pressure-sensitive adhesive (PSA) prior to the label being used and is removed immediately prior to application of the label to another surface.

Additionally, the release liner serves to facilitate cost effective manufacture of rolls or sheets of labels. It also functions as a carrier of labels for dispensing in automatic labeling operations and for computer printing in EDP applications. The performance attributes of a release liner are critical to both the manufacture and end-use application of pressure sensitive adhesive labels.

In conventional practice, the release liner is provided as a silicone layer on a support layer having high holdout, i.e., the support layer on which the silicone layer is deposited is resistant to silicone penetration. Where the support layer is paper, a special and, therefore, expensive paper, such as a super-calendered or densified glossy paper, is required. One currently accepted way of applying a silicone release composition to a high-holdout support layer is by solvent coating. Growing concern over the environment has imposed stringent restrictions regarding recovery of the solvent used in applying the solvent based silicone to the high-holdout backing paper or other materials.

An alternative to this is to use 100% solids silicone release compositions. These are supplied with a viscosity (usually <2000 cps) suitable for roll-coating techniques. Application of these to porous substrates such as low cost papers, machine finished (MF) or machine glazed (MG) papers, finds these materials to soak into the paper (penetrate the paper surface) to give ineffective coverage of the paper fibers unless excessively high quantities of expensive silicone are used. Ineffective coverage of the paper fibers provides unsuitable release liners for PSA applications especially where high speed convertibility is an essential performance feature.

A major application for a release liner is as part of bulk rolls of laminate consisting of the release liner, a face stock between which there is contained an inherently tacky self-adhesive, or pressure-sensitive adhesive. The adhesive may be permanent or repositionable. The rolls are converted by printing label information on the face stock, die cutting the labels through the face stock and adhesive to the surface of the release liner, followed by removal of the matrix surrounding the labels thus leaving a plurality of labels on the release liner.

It is important that the force required for release be sufficiently low for the intended application, but not so low that the die cut labels will release or predispense from a moving web turning a corner or remove with the waste matrix during its removal. The release force should also be not so high that the matrix is broken during its removal.

It would be desirable to provide a release liner which can be manufactured in a more economical fashion under a condition which eliminates the risk of environmental pollution, and in which the release level can be controlled at a variety of peel rates so as to enable high-speed convertibility, i.e., die cutting, matrix stripping.

Some attempts have been made to formulate release liners under environmentally safe conditions. U.S. Pat. Nos. 4,618,657 and 4,713,410 to Katchko, et al., propose the application of a reactive silicone as a component of an aqueous emulsion which also contains a blend of a fluid hydroxyl-functional resin, which is a fatty acid, or fatty alcohol-containing polyester, and a crosslinking agent for the hydroxy resin. The silicone portion is either a hydroxy- or alkoxy-functional polysiloxane, or a vinyl-addition type silicone.

The hydroxyl-functional polysiloxanes are reactive with the hydroxyl-functionality in the polyol-modified polyester resin. Alkoxy-functionality is also reactive with hydroxyl-functionality in the polyester resin, and a tin-based catalyst assists these condensation reactions. The crosslinker (hydrogen-functional polysiloxane) of the vinyl-addition type silicone can also react with hydroxyl functionality of the polyester resin or with unsaturation in the polyester resin, as well as the vinyl portion of the vinyl-silicone base polymer.

The polyester resins described in the '657 patent are said to be of low molecular weight and are further defined in the '410 patent to be free flowing liquids at room temperature. As such, they too can permeate into porous surfaces such as low cost, MF or MG papers in a manner similar to the 100% solids silicones. Their primary utility lies in the use of less-expensive polyester resins with silicone emulsions to reduce the overall cost of the release composition.

Among other difficulties with the systems described in the '410 and the '657 patents is that stratification must also occur, with the polyester resin stratifying to the paper and the silicone stratifying or "blooming" to the surface of the resin to form, in essence, a paper-resin-silicone laminate. Stratification takes time, and this results in liners having performance properties which are dependent upon processing speed.

The technology of the '657 and '410 patents has been evaluated, and the systems provided therein gave backings exhibiting excessive resin penetration into the machine-glazed paper backing and an appearance which would preclude acceptance in the marketplace. After two weeks at ambient temperature, these constructions developed a strong, offensive odor. Release values, when used in combination with a commercial emulsion acrylic adhesive, were too high (i.e., 50 to 55 N/m) at room temperature for all label applications. When the silicone constituent was varied, release could be lowered to 25 to 30 N/m at room temperature, but a greater amount of silicone was required. Appearance remained poor, with heavy streaking. Keil aging values were not obtained.

U.S. Pat. No. 4,362,833 to Mune, et al, describes a system where a condensation-curable, hydroxyl-functional emulsion silicone system is used in combination with aqueous resins having film-forming ability and bearing hydroxyl- and/or carboxyl-functional groups. The silicone content is high, 50–80%. In addition to having limited utility in respect to emulsion acrylic adhesives, condensation-curable silicones cure at an extremely slow rate, making them commercially unattractive for high-speed web processes.

Similarly, Japanese Patent Publication Sho 51-139835 to Vemura describes an emulsion, contained therein in a reactive condensation curable silicone, where the catalyst is an acid, alkali, amine, or organic metal salt (usually tin salt) used in combination with a resin emulsion. Where the resin may be inert, it is preferably reactive with the silicone. This technology would also be unsuitable for high-speed web processes.

The present invention relates to the improvement in the release surfaces utilizing aqueous-based silicone resin systems not heretofore contemplated in the art and adaptive to a broad-based utility in all phases where release surface is required, including all applications where controlled release is required.

SUMMARY OF THE INVENTION

According to the present invention, there is provided a release surface of controlled release force for substrates including, but not limited to, release liners suitable for use with pressure-sensitive adhesives and other applications. Preferably, the liner substrate is a paper and more preferably, a low-cost porous paper. The substrate is furnished with a release coating comprising a blend of a cured vinyl-addition silicone component containing therein dispersed and emulsifiable particles, and/or particle domains, as a contained component, preferably domains of resin particles. At silicone levels exceeding about 35% by weight, the silicone exists as a continuous phase surrounding the discrete particles and/or particle domains. At lower silicone levels there is insufficient silicone to surround all of the particles and the resulting blend exhibits properties of both the silicone and particle components. The coating is derived from an aqueous-based emulsion, substantially free of organic solvents. Release force or peel at a variety of peel-rates is controlled by the silicone-to-particle ratio, the nature of the particles used, the degree of interaction between the silicone and particle phases crosslinked density of the cured silicon phase, and coat weight, crosslinked density of the cured silicone phase, and coat weight.

In the presently preferred embodiment, there is provided a release liner comprising a porous paper substrate, preferably a porous paper substrate such as machine-glazed (MG) or machine-finished (MF) papers furnished with a release surface comprising a polymer blend of a cured vinyl-addition silicone component and dispersed organic resin particles and/or domains. The coating is derived from an aqueous-based emulsion of a vinyl-addition silicone system, its catalyst and one or more particle resins, essentially free of organic solvents, the resin being essentially inert with respect to the ability of the vinyl-addition silicone system to undergo cure.

The silicone content of the coating can, depending on the application, range from about 5 or less to about 80%, by weight, of the coating, preferably about 15 to about 50% by weight, and more preferably, from about 20 to about 40% by weight.

The dispersed particulate component comprises the balance of the coating and when a resin, may normally be rubbers or synthetic polymers having a glass transition temperature (Tg) from about −125 to greater than 100° C., a number-average molecular weight greater than about 2 times its entanglement molecular weight (Me), and typically having a particle size of about 2,500 angstroms or less in the emulsion. Domains may have a greater particle size.

The vinyl-addition silicone system is cured with a Group VIII metal catalyst, with the preferred catalyst being platinum in a complexed state. High rates of cure are a feature of the invention.

In the production of the release surface of the instant invention, the curable vinyl-addition silicone, i.e., base vinyl unsaturated silicon polymer and crosslinker silicone polymer and catalyst, the mutually combined emulsified particles or resin which must not negatively influence the silicone curing reaction are combined to achieve a mixture suitable for coating. To achieve this result, the combined emulsion desirably has a pH of less than about 8. Following coating, removal of the water by drying (by application of heat and/or air flow), and/or soaking into the porous paper, with added heat, curing occurs. This provides a release surface which is solid and remains substantially on the surface of a substrate including porous paper. Bloom or stratification is moot and negates the influence of coating/curing rates on the performance of the liner.

Using this robust process of high speed cure of compositions which do not require silicone separation from other materials, or bloom or stratification into discrete separate layers, products of substantially identical quality can be produced at rates up to or exceeding 3,000 feet per minute.

The products formed may be utilized in the full range of release applications, especially pressure-sensitive adhesive roll stock and converted at high-speeds (die-cutting, matrix stripping) among other applications. Release can be selectively tailored to enable production of a laminate with tandem adhesive or in off-line adhesive coating production modes without sacrifice of excellent convertibility (i.e., die cutting and matrix stripping), at reduced liner costs.

BRIEF DESCRIPTION OF THE DRAWINGS

FIGS. 2 and 3 illustrate matrix cutting apparatus;

FIG. 4 illustrates matrix removal from a converted roll label stock; and

FIG. 5 illustrates the release force required for matrix removal at 300 inches per minute as a function of silicone content for various pressure-sensitive adhesives.

DETAILED DESCRIPTION

Figure 1:
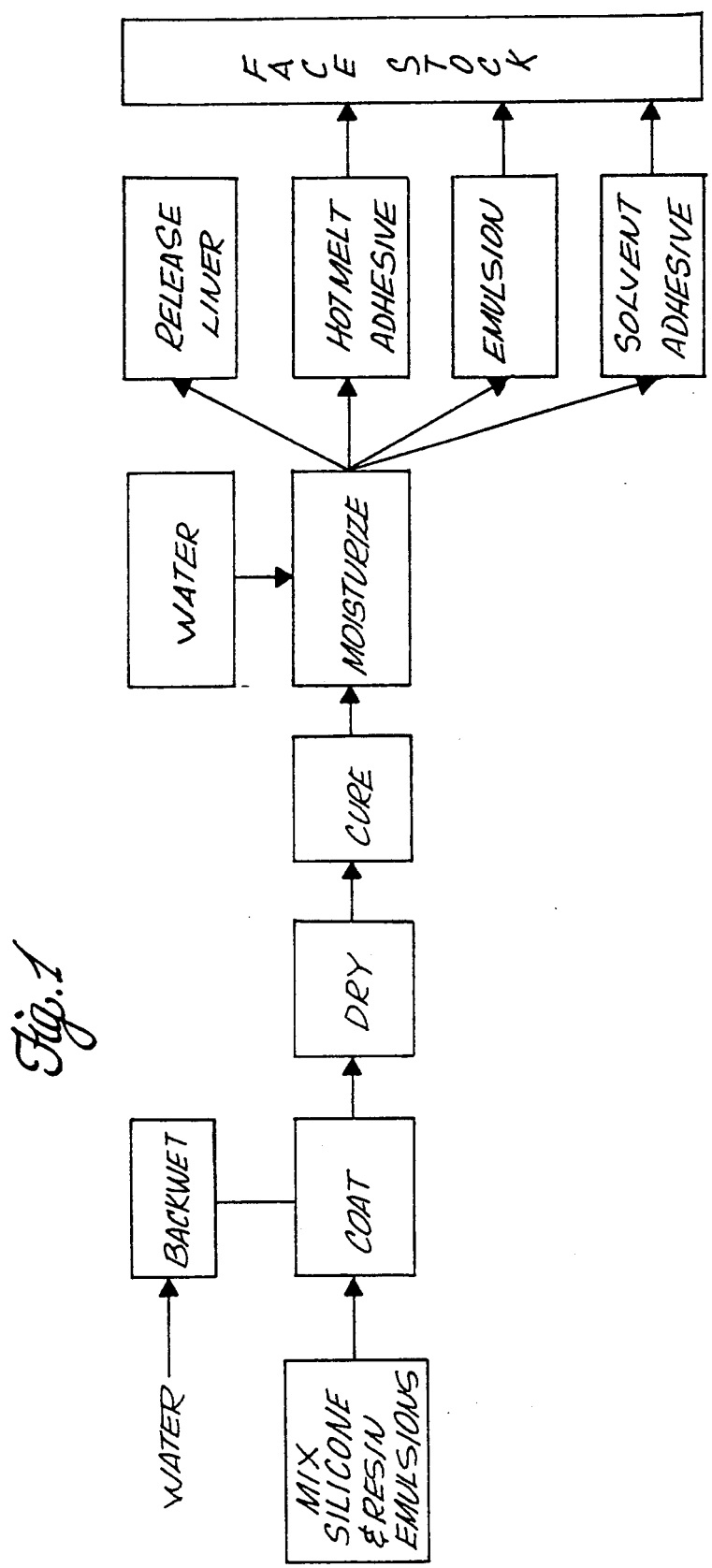
FIG. 1 illustrates in block form the process used in the conduct of the invention.

According to the present invention, there is provided novel, release surfaces enabling the production of low-cost release liners manufactured in an environmentally safe manner by emulsion coating of one or both sides of a liner substrate or web which may conveniently be a porous paper.

Features of the invention are that a coating applied as an emulsion using materials which gives good coating holdout on porous papers and enables high-speed cure, allowing a robust process, which gives the same type of product independent of whether coated and cured at the rate of 20 feet per minute or a rate of 3,000 feet per minute.

It also enables, over a broad range, the ability to adjust release to make the release effective with virtually any pressure-sensitive adhesive, and when formed into a laminate of release liner, pressure-sensitive adhesive and face stock, there is enabled excellent high-speed convertibility, i.e., die cutting and matrix stripping. A release surface made according to the present invention is made by coating a carrier such as a release liner paper stock, with aqueous emulsion of a curable vinyl-addition silicone system containing one or more vinyl unsaturated silicone polymers, one or more silicone hydride crosslinker, also a polymer, a Group VIII metal catalyst, preferably a platinum catalyst, and emulsified particles. The composition is free of ingredients which inhibit cure of the vinyl-addition silicone system. The coating is subjected to heat to drive off the water and initiate cure of the vinyl- addition silicone system, forming a blend on the paper in which the cured silicone phase contains therein substantially dispersed particle phases. The silicone phase may, depending on silicone concentration, be continuous or discontinuous. The particles may be individual or agglomerated, in whole or in part, to form domains, but are nevertheless still dispersed.

The silicone emulsions used in the present inventions are those which comprise silicone monomers having vinyl unsaturation which, when mixed with silicone hydride containing crosslinkers, is cured by a Group VIII metal catalyst, preferably a platinum catalyst. The emulsion, preferably contains reactive surfactants, that react with the silicone polymers so as not to interfere with pressure sensitive adhesive performance.

While not limiting presently preferred vinyl-addition silicone emulsions are mixtures of reactive vinyl silicone polymers of the formulas:

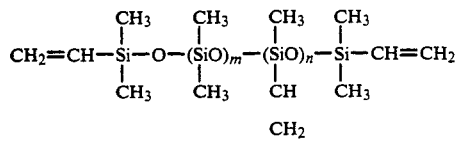

where m and n are independent integers, and silicone hydride crosslinking polymers of the formula;

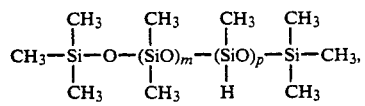

where m and p are also independent integers.

There may also be included conventional ingredients designed to modify the release properties.

Vinyl-addition silicone systems react by thermally induced addition-cure (hydrosilation) between polydimethyl-hydrogen siloxane crosslinkers and reactive vinyl-functional silicone polymers to furnish a cured silicone release composition. Following cure, corona treatment may be employed to modify release properties.

The vinyl-functional silicone molecules are polydimethyl siloxanes, where some of the methyl groups have been substituted with vinyl groups or other alkyl groups containing vinyl unsaturation, i.e., the reaction takes place between a vinyl substituted polydimethyl siloxane and polydimethylhydrogen siloxane.

The whole hydrosilation is catalyzed by silicone soluble complex compounds of Group VIII transition metals, particularly platinum. In normal use of vinyl-addition silicone systems, a small amount of inhibitor is added to prevent premature reaction between the silicone hydride and vinyl silicone groups following mixing of the coating components, before deposition onto the substrate. This inhibitor is removed or made ineffectual during the thermal curing process. Suitable silicone emulsion systems for practice of this invention can be obtained from Dow Corning, Rhone-Poulenc and Wacker-Chemie GmbH, e.g., the Wacker VP 1571E/1572 System.

For further details, see "The Chemistry and Technology of Thermally Cured Silicone Release Agents," by Richard P. Eckberg, CONVERTING & PACKAGING, December 1987, pages 152 to 155, the contents of which article are incorporated herein by this reference.

The particles which form part of the silicone/particle emulsion for coating on the liner to form a release liner may be normally provided as an emulsion by the manufacturer, but also can be directly dispersed into a silicone emulsion or silicone added to a particle emulsion. The particles may be inorganic or organic in nature. Organic particle emulsion resins are preferred and include, among others, acrylate resins, ethylene-vinyl acetate copolymer resins, methacrylate resins, natural rubber, styrene polymers, styrene-acrylonitrile resins, olefin resins, styrene-butadiene resins (SBR), preferably carboxylated styrene-butadiene copolymers, styrene-isoprene and styrene-butadiene random and block copolymers, chloroprene, ethylene-vinyl acetate-acrylate terpolymers, silicone polymers and the like. Resins typically have a glass transition temperature (Tg) from about $-125°$ C. or less to $100°$ C. or more, have a number average molecular weight greater than about 2 times their entanglement molecular weight (Me), and are of a particle size sufficiently low to enable formation of an emulsifiable dispersion, typically in the order of 2,500 Å Angstroms or less.

The substrate or support (liner or web) to which the emulsion is applied ("liner" herein) may be, but need not be, a specialized, densified paper or other material having silicone/solvent resistance (holdout). For label application, a much less expensive paper is preferred. When paper, the only characteristic required of the paper is that it have a sufficient mechanical strength, when both wet and dry, to be passed through coating, converting, computer printing, and dispensing operations without tear and have a caliper range to meet final product and tooling specifications. Suitable papers include MF and MG Kraft paper, super-calendared or densified Kraft paper, vellum newsprint paper, lightweight printing paper, and coated paper. Mechanical and wood-free papers are permissible, as are papers made from recycled fibers and the like. What is unique and unexpected is that there may be substituted 30- to 40-pound per ream porous papers for 50-pound per ream papers, which can be converted on the equipment used with 50-pound per ream paper without equipment modification. Other suitable substrates include porous and nonporous plastics and fabrics, woven and nonwoven, for specialty applications.

Requirements of the mixed emulsion at the time of application are that it has a suitable pH value and is free of agents which inhibit cure or cure rate of the vinyl-addition silicone system. Suitable pH is about 8 or less, typically about 4 to about 7.0. Silicones are supplied in emulsion with a solids content of normally 35 to 52%, while the resin emulsions are typically supplied at a solids content of 35 to 70%. Depending upon the paper and the design of the coating equipment, the solids content of the net emulsion formed by mixing the two may be modified to be as low as 5 to 10%, by weight, and upwards of 25 to 65%, by weight, solids by the use of additional water. Solids content may be maximized to facilitate the coating, drying and curing processes. Coating levels range from about 1 to about 10 grams/m$^2$, preferably about 2 to 5 grams/m$^2$ on a dry basis.

The ratio of the resin-to-silicone can be varied, and herein lies a particular benefit of the invention. Surprisingly, by varying the ratio, the release level can be varied easily and without recourse to control release additives. At low release speeds (i.e., 300"/min or less) the higher the ratio of resin to silicone for a given coating, the higher the release level. An acceptable weight ratio of resin-to-silicone, can be from 19:1 to 1:4, i.e., (5 to 80%) with release being controllable over a preferred silicone content of about 15 to about 50% silicone, and for release liners preferably about 20 to about 40% silicone. The use of more than 40% silicone is usually unnecessary and increases the cost of the coating without additional performance benefit.

Without being bound by theory, the solids (nonvolatile) content of the emulsions may be looked at as paints, where the silicone emulsion is the vehicle and the resin the pigment. The critical pigment volume concentration (CPVC), as explained in "PAINT FLOW AND PIGMENT DISPERSION", John Wiley and Sons, Second Edition, 1975, Chapter 5, incorporated herein by reference, for monosize, spherical resin particles is 0.524 for loose packing and 0.724 with tight tetrahedral packing. In random packing, the value is 0.639. At the CPVC, the spherical particles are just in contact with each other and the silicone vehicle fills the voids between the particles. Below the CPVC, or at higher silicone levels, the particles lose contact with each other by being separated by the silicone binder. However, above the CPVC or higher resin level (>64%), there is insufficient silicone to surround all the particles. This results in coatings which provide higher release values at low release speeds. At this elevated resin level, if the resin has a Tg >5° C. the overall modulus of the coating may be increased at higher rates of peel, which may not lead to high energy dissipation within the release coating, and high-speed release values may be reduced.

If there is significant silicone surrounding the particles (i.e., 50% silicone in the composition) or if the particles are soft resins (resins with a Tg < −20° C.), stresses on the surface at high rates of peel or release may lead to dissipation of energy within this soft polymer-blend network and provide increased release levels with increasing rates of peel.

With reference now to FIG. 1, release liners of the instant invention may be prepared according to the block diagram shown therein. A liner, not shown, is coated with a mixed silicone/particle emulsion. The liner may be back-wetted with water, if desired, and passed to an air flow oven, typically maintained at a temperature above which the water will readily evaporate from the emulsion, after which the catalyst will cause cure of the silicone resin to form a silicone phase in which there is dispersed particles. Because the silicone paper is now dry, it may be remoisturized with water to prevent curl. This provides an effective release liner which can be sold as such for coating with a hot melt, emulsion, or solvent adhesive. Time to cure with high air flow ovens is as short as 1.2 seconds, enabling machine speeds of up to 3,000 feet per minute, and also permits another unique feature of the invention, tandem coating with the adhesives. The exceptional feature of the release liners of the invention is that, even with the use of low-cost and lighter weight papers, e.g., 30- to 40-pound per ream paper, label constructions utilizing the release liners of the invention are especially adapted to conventional die cutting and matrix stripping at high conversion rates on equipment designed for higher paper weights, e.g., 40 or 50 pounds. The conversion process is illustrated in FIGS. 2, 3, and 4.

With reference thereto, matrix-stripped label stock is conventionally converted from a pressure-sensitive adhesive label stock 10, comprised of a face material 12, a pressure-sensitive adhesive layer 14, and a release liner 16, being passed between driven-anvil roll 18 and driven-die roll 20, having cutting edges 22, with penetration of the die into the laminate being determined by breaker 24. Labels 26 are cut to the release liner. There is removed from the laminate a matrix web 28 which, as illustrated in FIG. 4, bears the outline of the labels cut. The cut matrix web, which is waste, is wound for disposal.

Examples of presses used for the die cutting and the matrix stripping include the Webtron 650, which has an operating speed of up to 650 feet per minute, and the Mark Andy 4120 press, which processes stock up to 15-½ inches wide, and has an operating speed of up to 1,000 feet per minute.

Compositions of the instant invention may be varied in release properties taking into consideration the adhesive used to achieve not only adhesive coating rates at the highest rates of adhesive coating applications, but also achieve conversion by die cutting and matrix stripping as described above at rates exceeding those experienced with conventional 100% solids silicones on SCK (super-calendered Kraft) backings.

In particular, constructions containing the release liner of this invention have demonstrated superior converting performance as against traditional super calendered kraft (SCK) liner containing constructions. In wide web converting (i.e., 15-½" web width) converting trials of a hot melt adhesive containing construction with liners of this invention, converting speeds of approximately 650 to 775 feet per minute were realized using a standard four-up label die. The final converted product displayed excellent layflat characteristics. In contrast, the conventional SCK liner constructions displayed maximum converting speeds of but 450 to 500 feet per minute.

FIG. 5 shows the release characteristics as a function of styrene-butadiene resin (particulate component) to silicone ratio for three different pressure-sensitive adhesives.

While a primary application of the invention is for single or double coated release liners, other applications include: embossing strip release liners, protective release surfaces for floor tiles and wall coatings, release papers for low pressure plastic laminates, release materials for interleaves, release materials for self-sealing roofing, bakery tray liners, and like applications where a release surface of some definite release value exists.

The invention is further illustrated by the following nonlimiting Examples and Controls.

EXAMPLE I

This Example illustrates the preparation of a release liner using a porous MG Kraft paper by applying a mixture of emulsion silicone polymers and an emulsion resin. Such a paper substrate is unsuited to conventional siliconizing as practiced in the pressure-sensitive laminate manufacturing industry.

The Example also illustrates that, by changing the ratio of resin to silicone in the release coating, the ease of separation of a self-adhesive laminate product from such a liner can be controlled.

To make the emulsion release coating, the emulsion silicone polymers were VP 1571E/1572, commercially available from Wacker Chemie, mixed with the resin emulsion known as Baystal P1800 from Bayer, with ratios of 4:1 and 7:3 (dry weight resin: dry weight silicone). No special equipment or precautions are needed. Water may be added, if desired, to facilitate coating the substrate paper with the mixture.

The mixture was Meyer-rod-coated onto sheets of a commercially available MG Kraft paper using a laboratory pilot coater. The coated sheets were then placed in an oven at 130° C. for 20 seconds to dry the emulsions and cure the silicone layer.

The sheets were removed from the oven and coated with an emulsion acrylate pressure-sensitive adhesive. After drying the adhesive, a face stock (label paper) was applied to the adhesive layer.

Throughout the whole experiment conditions were kept constant to eliminate erroneous results due to variations in manufacturing conditions.

Release force is the force required to peel a strip of face stock of given dimensions from the release liner, or vice versa. The method used in these instances was the FINAT release test, i.e., the force required to peel a one-inch (2.54 cm) wide strip of release liner from its face stock. The results obtained are given below in Table 1.

TABLE 1

| Ratio Rubber:Silicone | Release Force (N/m) |
| --- | --- |
| 4:1 | 22.8 |
| 7:3 | 13.9 |

EXAMPLE II

In this Example, the ratios of resin to silicone ratios were varied and the adhesive was changed to a hot melt, i.e., an adhesive made from synthetic thermoplastic block copolymers blended with tackifiers and oils. Hot melt adhesive is applied as a hot, melted plastic which, when cool, acts as a pressure-sensitive adhesive. The method of manufacture is essentially the same as in Example 1, but the adhesive is applied by an extrusion die at the desired coating weight.

Throughout the whole experiment conditions were kept constant to eliminate erroneous results due to variations in manufacturing conditions.

TABLE 2

| Ratio Rubber:Silicone | Release Force (N/m) |
| --- | --- |
| 1:2 | 5.4 |
| 4:3 | 7.7 |
| 2:1 | 10.4 |
| 3:1 | 23.2 |

The above Examples clearly show that simply by varying the ratio of rubber to silicone, the release levels can be easily varied for a given adhesive.

EXAMPLE III

Although the observed change in properties of the release coating of this invention at silicone to non-silicone ratios about the CPVC (36% silicone as the fluid phase and 64% non-silicone resins as the dispersed phase), implies that the release coating achieved by practice of this invention is a composition wherein at silicone levels exceed 36% by weight the cured silicone phase surrounds a substantially discrete particulate phase or domains, additional efforts were undertaken to characterize these coatings. One purpose of this effort was to obtain confirmation that the unique combinations of materials described in this patent application provide release compositions that are unknown to the prior art which describe achievement of release properties with mixed systems via silicone bloom or stratification.

A Wacker 1571E/1572 emulsion silicone was mixed together with Polysar 3083 emulsion containing a styrene-butadiene copolymer resin at a ratio of one part silicone per two parts SB resin on a solids basis. This was coated onto a machine glazed kraft paper using roll-coating methods. This was passed through a high-airflow oven at elevated temperature to remove the water and cure the silicone phase. Following remoisturization, a suitable release liner was obtained, a portion of which was used for characterization as described below.

A Transmission Electron Microscope (TEM) was used to study thin cross sections of the liner which had been subjected to osmium tetroxide staining.

The osmium tetroxide adds to unsaturation in organic compositions to provide darker areas to the TEM where such unsaturation exists. The SB copolymer in the release coating of this example contains unsaturation.

The TEM pictures showed dark domains among a white background. The size of some of these domains were substantially the same as the SB resin particles (1350Å) in the original SB resin emulsion as determined by light scattering techniques. The domains as a whole were dispersed and did not form a separate layer.

Additional confirmation for this description was obtained by making thick (1/16") pieces of the coating (Wacker 1571E/1572 with Polysar 3083 SB resin) at a variety of silicone to resin ratios (100 to 0%). This was done by slow evaporation of the water phase of the mixtures in a Teflon mold. This was followed by cure of the silicone at elevated temperatures to obtain pieces which were evaluated for their visco-elastic properties using a Rheometrics RMS-800 Mechanical Spectrometer. The data obtained confirms that at silicone levels exceeding 30% the silicone is predominately the continuous phase with the SB copolymer resin as a particulate, dispersed phase. At lower levels of silicone there is a formation of a polymer blend having both silicone and SB copolymer resin domains. Evidence for the interaction between these phases was also noted.

Differential Scanning Calorimetry (DSC) data on these thick pieces of coating composition supports the above description, including the interaction between the silicone and the SB resin phases.

EXAMPLE IV

Mixtures of silicone emulsion Wacker 1571E/1572 and Polysar 3083 styrene-butadiene emulsion resin were made at six different silicone-to-resin rations (solids basis). These were Meyer-rod-coated onto a 32-pound per ream machine finished paper from James River-Otis, dried and cured in a high air flow oven to produce release liners suitable for use with pressure-sensitive adhesives. These were coated with three different adhesives (a rubber/resin as a hot melt, an emulsion acrylic, and an emulsion tackified acrylic) and laminated with a facestock (following drying of the emulsion adhesives) to produce constructions for release testing after 24 hours of aging. The data for this testing is presented graphically in FIG. 5.

It is apparent that papers of low basis weight can function as release liners when used with compositions of this invention and that they are suitable for use with several types of pressure sensitive adhesives. Additionally, it is shown that control of release level may be achieved by varying the ratio of silicone to resin in the coating composition.

EXAMPLE V

Mixtures of Wacker silicone emulsion 1571E/1572 and Bayer P5900 styrene-butadiene resin emulsion were made at three different silicone to resin rations (25, 33, 50% silicone). These were coated onto a machine glazed Kraft paper by roll coating techniques on a production-type coater, dried and cured in a high air flow oven to produce release liners suitable for use with pressure sensitive adhesives. These release liners were then coated with a tackified acrylic emulsion adhesive, dried and laminated with a face stock and provided a functional pressure-sensitive adhesive stock useful for die cutting and matrix stripping to form labels at high speeds.

EXAMPLES VI TO XI

To determine the utility of additional types of resin emulsions as a mixture with vinyl silicone emulsion systems, several different commercial resin emulsions were mixed with the Wacker 1571E/1572 silicone emulsion being used at three silicone to resin ratios (20, 35, 50% silicone on a solids basis). These were Meyer rod coated onto a machine glazed Kraft paper, dried and cured in a high air flow oven to produce release liners for testing.

To these liners there were laminated two tapes having either a solvent-based rubber/resin adhesive or a solvent-based metal crosslinked acrylic adhesive. Both of these adhesives are known to be aggressive to release compositions. The resulting constructions were subjected to 24-hour room temperature aging and Keil aging, then tested for release level at 300"/min peel and loop tack properties.

Keil aging is a form of accelerated aging (70° C., ¼ PSI, 20 hours) and is viewed as providing a worst-case of what might be obtained with extended room temperature aging.

Loop tack testing has been found to be very discriminating in demonstrating transfer of materials from the release composition to applied adhesives. Reduction in tack properties is not necessarily indicative of loss of adhesive properties unless it is extreme (retention of <25% tack properties).

The resins for this evaluation comprise commercial materials having Tgs as high as 103° C. and as low as −60° C. The two resins having Tgs of 100° and 103° C. would not be considered film forming materials and thus further distinguish this invention from some art which calls for good film formers as the nonsilicone portion of the coating compositions.

Additionally, it is of interest to note that the acrylate polymer of Avery Chemical is a commercial pressure-sensitive adhesive.

The data for evaluation of the utility of these additional resin emulsions is presented in Table 3.

It is apparent that many types of resin emulsions have utility with the present invention. Seemingly, the only restriction is that the resulting mixtures provide composition suitable for coating, and that the resin emulsion not inhibit the cure or cure rate of the silicone emulsion.

It is also shown that the resulting polymer blends from these mixtures also provide higher release values at concentrations exceeding the CPVC (as discussed above) or less than 36% silicone. Additionally, it is seen that the release level can also be controlled by choice of the resin phase in these poly-blend release coatings. Thus, both the amount and the type of resin phase can be used to control the release level of compositions of this invention. It is shown that the degree of adhesive interaction with compositions of this invention are dependent on the type of adhesive used (release level is different for the rubber/resin adhesive as compared to the acrylic adhesive) and thus compositions for release coatings of this invention can be chosen to maximize the performance of the constructions having different adhesives.

Although there is some reduction in loop tack properties of adhesives with liners of these examples in comparison to the control release liner which has a well-cured 100% solids silicone release composition on a super-calendered Kraft paper, this loss is not deemed excessive and yet will provide constructions suitable for a wide range of products. The loss is considered to be primarily from the surfactants in the silicone and the resin emulsions (the greater the resin concentration, the greater the tack loss) and is a consideration when selecting a resin emulsion from supplier.

TABLE 3

| Example | VI | | VII | | VIII | | IX | | X | | XI | |
|---|---|---|---|---|---|---|---|---|---|---|---|---|
| MANUFACTURER | BF Goodrich | | Morton Thiokol | | Dupont | | Avery Chemical | | BF Goodrich | | GE | |
| PRODUCT | HYCAR- | | Lytron 621 | | Neoprene Latex 115 | | AE 220HS/H | | Hystretch- | | GE 5000 | |
| COMPOSITION | 2600X374 MMA | | Modified-Polystyrene | | Neoprene | | Emulsion Acrylic Adhesive | | Latex V-60 Acrylic | | 100% Silicone-Coating | |
| Tg (°C.) | 103 | | 100 | | −36 | | −51 | | −60 | | −120 | |
| | RT | KEIL | RT | KEIL | RT | KEIL | RT | KEIL | RT | KEIL | RT | KEIL |
| I. RELEASE (g/2 in) [90°, 300 ipm] | | | | | | | | | | | | |
| RUBBER/RESIN SOLVENT ADHESIVE | | | | | | | | | | | | |
| 20% SILICONE | 17.6 | 979.0 | 13.0 | 457.4 | 16.1 | 224.8 | 39.9 | 227.4 | 77.2 | 255.9 | | |
| 35% SILICONE | 18.1 | 190.6 | 4.1 | 185.4 | 22.3 | 199.9 | 5.2 | 175.1 | 43.0 | 129.0 | | |
| 50% SILICONE | 23.8 | 82.4 | 5.2 | 69.4 | 24.9 | 131.1 | 5.2 | 140.9 | 35.2 | 115.0 | | |
| 100% SILICONE | | | | | | | | | | | 5.2 | 18.1 |
| METAL-CROSSLINKED ACRYLIC SOLVENT ADHESIVE | | | | | | | | | | | | |
| 20% SILICONE | 81.3 | 481.7 | 44.0 | 407.1 | 53.4 | 137.3 | 15.5 | 207.7 | 148.7 | 240.9 | | |
| 35% SILICONE | 35.2 | 97.4 | 26.4 | 111.4 | 54.9 | 115.5 | 11.9 | 146.6 | 84.4 | 123.8 | | |
| 50% SILICONE | 68.4 | 60.1 | 16.6 | 58.2 | 46.1 | 88.6 | 6.7 | 72.0 | 50.2 | 76.7 | | |
| 100% SILICONE | | | | | | | | | | | 8.8 | 15.0 |

TABLE 3-continued

| Example | VI | VII | VIII | IX | X | XI | |
|---|---|---|---|---|---|---|---|
| | | | II. LOOP TACK (N/M) | | | | |
| | | | RUBBER/RESIN SOLVENT ADHESIVE | | | | |
| 20% SILICONE | 1187 | 581 | 1175 | 1115 | 1062 | 871 | 1339 | 709 | 853 | 556 | |
| 35% SILICONE | 1463 | 1151 | 1346 | 1161 | 1119 | 1002 | 1273 | 650 | 807 | 617 | |
| 50% SILICONE | 1502 | 1295 | 1522 | 1522 | 1093 | 1094 | 1418 | 801 | 932 | 787 | |
| 100% SILICONE | | | | | | | | | | 1625 | 1523 |
| | | | METAL-CROSSLINKED ACRYLIC SOLVENT ADHESIVE | | | | |
| 20% SILICONE | 497 | 476 | 463 | 380 | 410 | 403 | 383 | 417 | 311 | 447 | |
| 35% SILICONE | 506 | 556 | 483 | 414 | 341 | 422 | 417 | 418 | 446 | 384 | |
| 50% SILICONE | 568 | 576 | 420 | 466 | 344 | 475 | 399 | 451 | 476 | 516 | |
| 100% SILICONE | | | | | | | | | | 588 | 600 |

Note: The table above has columns spanning VI through XI with multiple sub-values per example column.

EXAMPLE XII

To further demonstrate the ability to control the release profile (release level vs. release speed) by choice of the resin and the concentration of the resin phase in the silicone phase of the polymer-blend release coatings of this invention, the following compositions were made at two ratios of silicone to resin (33 and 20% silicone) and tested for release level at two peel speeds (300 "/min and 1200"/min).

The emulsions Wacker silicone 1571E/1572 were mixed with Polysar 3083 styrene-butadiene resin (Tg=25C), Flexcryl 1653 ethylene-vinylacetate-acrylate resin from Air Products and Chemicals (Tg=-32C), or Nicoseal 3-2160 poly-2-ethylhexylacrylate resin from IGI Adhesives (Tg=-60C). These were Meyer-bar-coated onto a machine-glazed paper and put into a high airflow oven for removal of the water and cure of the silicone phase to produce liners for testing. To these were laminated a tape having a hot melt rubber/resin adhesive to make constructions for testing following 24 hours of aging at room temperature. The result of this testing is provided in Table 4.

TABLE 4

| Resin | % Silicone | Release @ 300 in/min (N/m) | Release @ 1200 in/min (N/m) |
|---|---|---|---|
| 3083 | 33 | 6.8 | 8.4 |
| | 20 | 7.1 | 6.4 |
| 1653 | 33 | 9.9 | 40.5 |
| | 20 | 23.8 | 40.5 |
| 3-2160 | 33 | 14.7 | 64.9 |
| | 20 | 125.0 | 126 |

It is apparent that control of the release profile (release level vs. release speed) can be achieved by choice of the type and amount of resin phase of release coatings of this invention.

EXAMPLES XIII TO XVIX AND CONTROLS A TO C

The following study was performed to establish the flexibility of using release liners of the instant invention in the conversion process of FIGS. 2, 3 and 4. Normally a converter has little flexibility in the weight (lbs./ream) of the liner which can be processed with a particular equipment set-up. In accordance with the invention, low weight papers can be used on systems set for papers of higher weight. What will be considered are conversion equipment used for 40- and 50-pound per ream release liner paper, where again the die cuts to the release liner, to show that lower weight papers can be used provided there is employed the release compositions of the invention. In particular, there was in each instance a release liner having as the release surface the composition 33% by weight silicone with a Polysar 3083 styrene-butadiene resin of Examples 4 and 12. The paper weight in pounds per ream and its manufacturer are shown in Tables 5, 6 and 7 and compared to the standard release paper as the control. Table 8 shows the die configurations used. In the tables, the face material 12 was a 50-pound per ream high gloss (Table 5), 50-pound per ream electronic data processing paper (Table 6) and Vellum (Table 7). The pressure-sensitive adhesive was a commercial hot melt adhesive based on a tackified Kraton styrene-isoprene-styrene block copolymer. In determining release values, the release liner is pulled from the face stock (liner off) or the face stock and adhesive pulled from the liner (face off). In evaluating the various runs, the "run speed" means the speed at which the operator felt waste was minimal; "hangers" gives a speed range over which one or more die cut labels will remain with the matrix, while "flags" means the range over which matrix breakage can occur for the die cut matrices of Table 8.

The results clearly establish that using release liners of the invention paper weight can be readily varied without modifying equipment and good conversion achieved.

TABLE 5

| Liner | | Ex. XIII 30# Flexpac | Ex. XIV 32# MF J. R. Dunn | Control A 40# SCK[a] |
|---|---|---|---|---|
| Release Values (N/m): | | | | |
| Liner Off | | 19/20 | 3/7 | 9/12 |
| Face Off | | 16/22 | 9/12 | 13/15 |
| Webtron Converting Details (Meters/min.): | | | | |
| Die #1 | Run Speed | 70 | 200 | 200 |
| | Hangers | 30–200 | None | None |
| | Flags | 85–200 | None | None |
| Die #2 | Run Speed | 120 | 200 | 200 |
| | Hangers | 130–134 | None | None |
| | Flags | 130–134 | None | None |
| Die #3 | Run Speed | 76 | 200 | 200 |
| | Hangers | 46–200 | None | None |
| | Flags | 84–200 | None | None |
| Die #8 | Run Speed | 145 | 200 | 200 |
| | Hangers | 46–200 | None | None |
| | Flags | 183–200 | None | None |

[a]Super-calendared Kraft

TABLE 6

| Liner | | Ex. XV 40# MG- J. R. Dunn | Ex. XVI 35# MG- Geo. Pacific | Ex. XVII 40# MG- Thil. | Control B 50# SCK[a] |
|---|---|---|---|---|---|
| Release Values (N/m): | | | | | |
| Linar Off | | 13/16 | 24/27 | 19/23 | 26/28 |
| Face Off | | 23/23 | 24/30 | 21/28 | 28/24 |
| Webtron Converting Results (Meters/min.): | | | | | |
| Die #1 | Run Speed | 200 | 200 | 200 | 200 |

TABLE 6-continued

| Liner | | Ex. XV 40# MG- J. R. Dunn | Ex. XVI 35# MG- Geo. Pacific | Ex. XVII 40# MG- Thil. | Control B 50# SCK[a] |
|---|---|---|---|---|---|
| | Hangers | None | None | None | None |
| | Flags | None | None | None | None |
| Die #3 | Run Speed | 200 | 200 | 200 | 200 |
| | Hangers | None | None | None | None |
| | Flags | None | None | None | None |
| Die #8 | Run Speed | 200 | 200 | 200 | 200 |
| | Hangers | None | None | None | None |
| | Flags | None | None | None | None |

[a]Super-calendared Kraft

TABLE 7

| Liner | | Ex. XVIII 40# MG- Thil. | Ex. XVIX 40# MG- Thil. | Control C 50# SCK[a] |
|---|---|---|---|---|
| Mark Andy Converting Details (Meters/min.): | | | | |
| Die C* | Run Speed | 100 | 100 | 100 |
| | Flags | 107–110 | 75–110 | 76–110 |
| | Hangers | 107–110 | 107–110 | 107–110 |
| Die A | Run Speed | 183 | 236 | 139 |
| | Flags | 183–261 | 198–253 | 145–244 |
| | Hangers | 244–261 | 244–253 | 152–244 |

[a]Super-calendared Kraft
(*Includes in-line fanfolding)

TABLE 8

Die Descriptions

| Die | Label Size (W × L) | Web Width | Number Across Web | Number Around Web | Cross Direction Matrix | Machine Direction Matrix | Label Corner Radius |
|---|---|---|---|---|---|---|---|
| #1 | 4½ × 15/16 in. | 5 in. | 1 | 6 | 1/16 in. | — | ⅛ in. |
| #2 | 1-⅞ × 2-25/32 in. | 6-¼ in. | 3 | 2 | ⅛ in. | ⅛ in. | 1/16 in. |
| #3 | 5 × 3 in. | 5-¼ in. | 1 | 2 | 1/16 in. | — | 1/16 in. |
| #8 | 3 × 2-1/16 in. | 6-¼ in. | 2 | 2 | 3/32 in. | ⅛ in. | 3/16 in. |
| A | 3-¼ × 2-15/16 in. | 14-¾ in. | 4 | — | 1/16 in. | 1/10 in. | — |
| C | 5 × 2-⅞ in. | 11 in. | 2 | — | ⅛ in. | ⅛ in. | — |

EXAMPLE XX

Studies were made varying concentrations of latexes of a carboxylated styrene-butadiene copolymer (SBR) having a glass transition temperature of 25° C., known as ND683 manufactured and sold by BASF, and a polychloroprene having a glass transition temperature of −37° C. known as Neoprene 115 and manufactured by duPont, in admixture with an emulsion-based, vinyl-addition silicone system known as 1571E/1572 supplied by Wacker Chemie. The formulation made was applied to machine glazed paper using a 4 Meyer bar, dried and cured at 130° C. in a high airflow oven, then placed in an environmental conditioning room (23° C., 50% relative humidity) for 20 hours. Release coating was about 4.5g/m².

To the various release liners made using the compositions there was applied pressure sensitive adhesive tapes having as the adhesive a hot melt rubber based pressure sensitive adhesive known as GP-1 manufactured and sold by Avery International. The laminated constructions were Keil aged (70° C., 0.25 psi, 20 hours) and evaluated. The adhesive was peeled at 180° angle. Table 9 reports the force required to achieve peel (N/m) at the speed given in meters per minute for the composition given as (% silicone, % neoprene, % SBR).

The study revealed that excellent release can be obtained over a broad range of silicon concentrations but that release can be varied as a function of particle size (1350 Å for SBR and 3000 Å for neoprene).

EXAMPLE XXI

Figure 6:
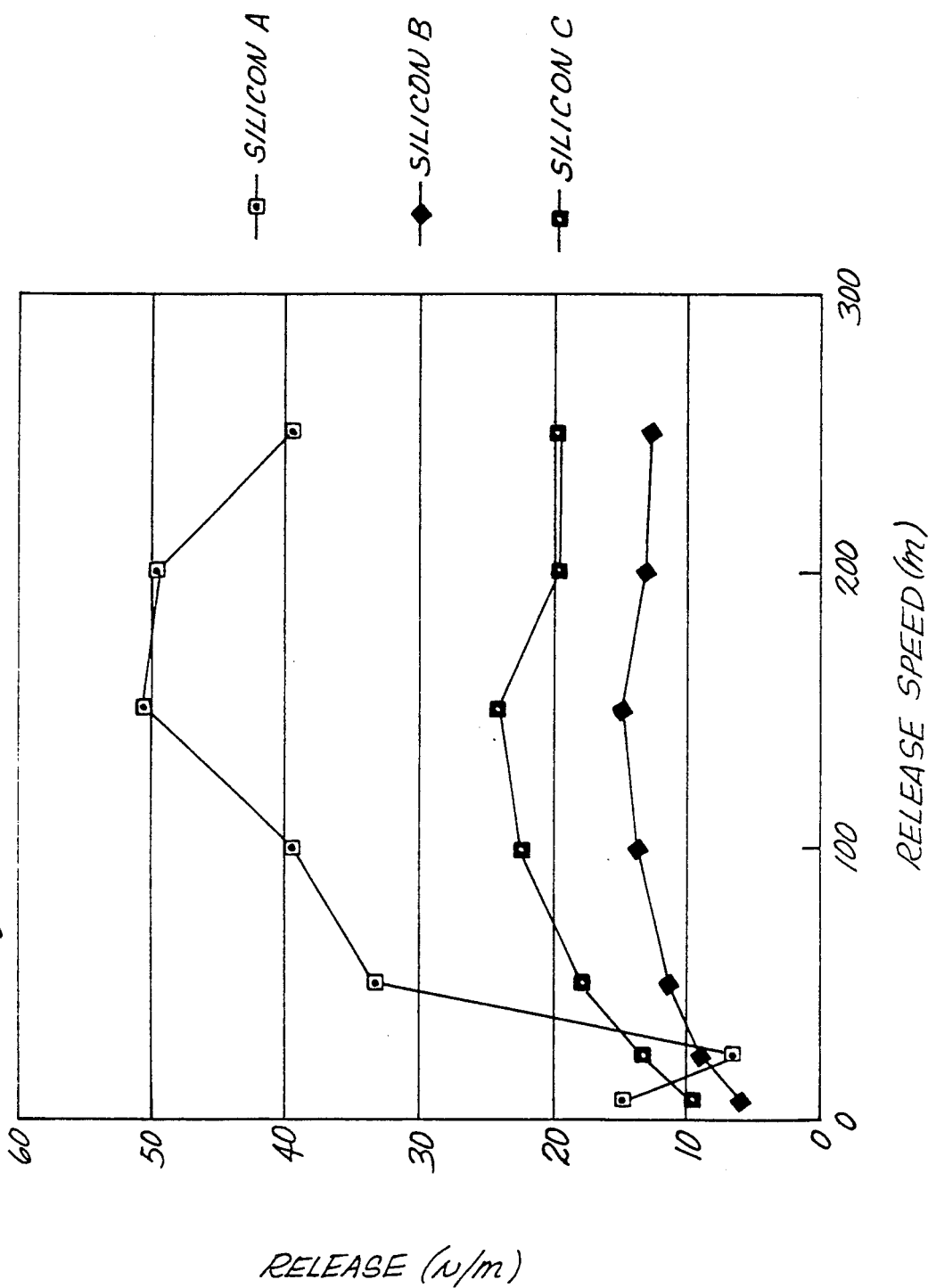

Using the adhesive tape described in Example XX there was evaluated an emulsion containing three different vinyl addition silicons in admixture with the same particulate resin. The resin was the neoprene resin identified in Example XX and present in a concentration of 80% by weight based on the weight of the resin and the silicon. The silicons used were Wacker Chemie 1571E/1572 (Silicon A) Rhone Poulen PC-104 (Silicon B) and Dow Corning X2-7604A/X2-7605A (Silicon C). The force required to release the adhesive at various speeds is shown in FIG. 6.

TABLE 9

| | Compositions | | | | | |
|---|---|---|---|---|---|---|
| Speed (m/min) Composition | 25,000 | 50,000 | 100,000 | 150,000 | 200,000 | 250,000 |
| 100%, 0, 0 | 8 | 5 | 5 | 6 | 6 | 6 |
| 20, 80, 0 | 6 | 33 | 39 | 51 | 49 | 39 |
| 35, 65, 0 | 7 | 20 | 28 | 52 | 48 | 54 |
| 50, 50, 0 | 9 | 17 | 24 | 31 | 31 | 32 |
| 15, 85, 0 | 29 | 63 | 59 | 66 | 56 | 51 |
| 10, 90, 0 | 20 | 47 | 38 | 44 | 36 | 32 |
| 5, 95, 0 | 90 | 108 | 56 | 76 | 46 | 38 |
| 40, 0, 60 | 19 | 18 | 18 | 17 | 19 | 18 |
| 35, 0, 65 | 20 | 25 | 25 | 26 | 29 | 28 |
| 20, 0, 80 | 151 | 133 | 102 | 106 | 86 | 78 |
| 20, 53, 2 | 12 | 21 | 27 | 28 | 28 | 25 |
| 20, 27, 53 | 14 | 17 | 18 | 18 | 17 | 18 |
| 35, 43, 22 | 15 | 19 | 18 | 20 | 21 | 20 |
| 35, 43, 22 | 11 | 17 | 20 | 18 | 16 | 16 |
| 20, 40, 40 | 11 | 12 | 14 | 13 | 13 | 12 |
| 10, 70, 20 | 12 | 10 | 10 | 9 | 8 | 8 |
| 10, 45, 45 | 7 | 8 | 5 | 5 | 5 | 4 |
| 15, 28, 57 | 14 | 9 | 7 | 9 | 8 | 7 |
| 15, 57, 28 | 17 | 13 | 12 | 10 | 9 | 8 |
| 5, 87, 8 | 85 | 114 | 64 | 79 | 59 | 64 |
| 5, 75, 20 | 28 | 27 | 22 | 24 | 15 | 15 |
| 10, 80, 10 | 31 | 25 | 18 | 20 | 16 | 16 |
| 15, 75, 10 | 17 | 37 | 36 | 33 | 27 | 25 |
| 20, 70, 10 | 18 | 44 | 51 | 52 | 46 | 43 |
| 10, 20, 70 | 108 | 87 | 58 | 70 | 54 | 45 |
| 20, 10, 70 | 93 | 85 | 64 | 67 | 56 | 55 |
| 5, 10, 85 | | | Paper Tear | | | |
| 10, 10, 80 | | | Paper Tear | | | |
| 10, 15, 75 | 142 | 161 | 148 | 113 | 106 | 115 |
| 0, 100, 0 | | | Paper Tear | | | |
| 0, 0, 100 | | | Paper Tear | | | |

What is claimed is:
1. A pressure-sensitive adhesive stock suitable for label formation by converting which pressure-sensitive adhesive stock comprises a laminate of a face stock, a pressure-sensitive adhesive layer and a release liner in which the release liner comprises a substrate having thereon a solid release coating which remains substantially on said substrate surface, said solid release coating comprising a blend of a cured silicone polymer compo- nent containing a particulate component, the cured silicone polymer component which is present in an amount of from about 5 to about 80 percent weight based on the weight of the cured silicone polymer component and particulate component and obtained by hydrosilation cure of a vinyl-addition silicone system comprised of at least one vinyl silicone polymer, at least one silicone hydride crosslinker catalyzed by a Group VIII metal catalyst, the coating being formed by application of an aqueous-based emulsion of a curable vinyl-addition silicone system, catalyst and contained particular component to the substrate surface, drying the applied emulsion and inducing hydrosilation cure of the vinyl-addition silicone system.

2. A pressure-sensitive adhesive stock suitable for label formation by conversions which pressure-sensitive adhesive stock comprises a face stock, a pressure-sensitive adhesive layer and a release liner in which the release liner comprises a substrate having thereon a solid release coating which remains substantially on said substrate surface, said solid release coating comprising a polymeric blend of a cured silicone component and a particulate resin component, the cured silicon component which is present in an amount of from about 5 to about 80 percent by weight based on the weight of the cured silicone polymer component and particulate component and obtained by hydrosilation cure of a vinyl-addition silicone system comprised of at least one vinyl silicone polymer and at least one silicone hydride crosslinker catalyzed with a Group VIII catalyst, the particulate resin component comprising at least one resin and the coating being formed by application of an aqueous-based emulation of the vinyl-addition silicone system, catalyst and containing the particulate resin component to the substrate surface, drying the applied emulations and inducing hydrosilation cure of the vinyl-addition silicone system.

3. A pressure-sensitive adhesive stock as claimed in claim 1 in which the cured silicone polymer component is present in an amount of from about 15 to about 50 percent by weight based on the weight of the cured silicone component and particulate component.

4. A pressure-sensitive adhesive stock as claimed in claim 1 wherein the cured silicone polymer component is present in an amount of from about 20 to about 40 percent by weight based on the weight of the cured silicone component and particulate component.

5. A pressure-sensitive adhesive stock as claimed in claim 1 wherein the release liner substrate is paper.

6. A pressure-sensitive adhesive stock as claimed in claim 5 wherein the paper is porous paper.

7. A pressure-sensitive adhesive stock as claimed in claim 5 in which the paper is a less than 50-pound per ream paper.

8. A pressure-sensitive adhesive stock as claimed in claim 5 in which the paper is a 40-pound per ream paper.

9. A pressure-sensitive stock as claimed in claim 6 in which the paper is about a 30-pound per ream paper.

10. A pressure-sensitive adhesive stock as claimed in claim 9 wherein the paper stock is selected from Kraft paper, super-calendared Kraft paper, vellum newsprint stock, coated papers, wood-free papers, and papers made from recycled fiber.

11. A pressure-sensitive adhesive stock as claimed in claim 9 in which the paper is machine finished or machined-glazed paper.

12. A pressure-sensitive adhesive stock as claimed in claim 1 in which the Group VIII metal is platinum.

13. A pressure-sensitive adhesive stock as claimed in claim 2 in which the cured silicone resin is present in an amount of from about 15 to about 50 percent by weight based on the weight of the cured silicone component and particulate resin component.

14. A pressure-sensitive adhesive stock as claimed in claim 2 wherein the cured silicone component is present in an amount of from about 20 to about 40 percent by weight based on the weight of the silicone component and the particulate resin component.

15. A pressure-sensitive adhesive stock as claimed in claim 2 wherein the release liner substrate is paper.

16. A pressure-sensitive adhesive stock as claimed in claim 15 wherein the paper is porous paper.

17. A pressure-sensitive adhesive stock as claimed in claim 15 in which the paper is less than about a 50-pound per ream paper.

18. A pressure-sensitive adhesive stock as claimed in claim 15 in which the paper is about a 40-pound per ream paper.

19. A pressure-sensitive stock as claimed in claim in which the paper is a 30-pound per ream paper.

20. A pressure-sensitive adhesive stock as claimed in claim 19 wherein the paper stock is selected from Kraft paper, super-calendared Kraft paper, vellum newsprint stock, coated papers, wood-free papers, and papers made from recycled fiber.

21. A pressure-sensitive adhesive stock as claimed in claim 20 in which the paper is machine finished or machine glazed paper.

22. A pressure-sensitive adhesive stock as claimed in claim 2 in which the Group VIII metal is platinum.

23. A pressure-sensitive adhesive stock suitable for conversion to labels which pressure sensitive adhesive stock comprises a laminate of a face stock, a pressure-sensitive adhesive layer and a release liner in contact with the pressure-sensitive adhesive layer, said release liner formed of a porous paper substrate having thereon a solid release coating which remains substantially on the porous paper substrate surface, said release coating comprising a polymer blend of a cured silicone component and a particulate resin component, the cured silicone being obtained by hydrosilation cure of vinyl-addition silicone system comprising at least one vinyl silicone polymer and at least one silicone hydride crosslinker catalyzed with a platinum catalyst, in which there is dispersed the particulate resin component, the resin component comprising at least one resin having a glass transition temperature of from about $-125°$ C. to about $100°$ C., a number average molecular weight greater than 2 times its entanglement molecular weight, and being essentially inert to the cure of the vinyl-additional silicone system, the coating being formed by application of an aqueous-based emulsion of the vinyl-additional silicone system and the particle resin component to the paper surface, drying the applied emulsion and inducing hydrosilation cure of the vinyl-addition silicone system, said release coating having a cured silicone polymer component content of from about 5 to about 50 percent by weight based on the weight of the cured silicone polymer component and particulate resin component, said release coating being provided on the paper substrate surface at a coat weight of from about 1 to about 10 $g/m^2$.

24. A pressure-sensitive adhesive stock as claimed in claim 23 in which the cured silicone resin component is present in an amount of from about 15 to about 50 percent by weight based on the weight of the cured silicone component and particulate resin component.

25. A pressure-sensitive adhesive stock as claimed in claim 23 wherein the cured silicone resin component is present in an amount of from about 20 to about 40 percent by weight based on the weight of the cured silicone component and resin component.

26. A pressure-sensitive adhesive stock as claimed in claim 23 wherein the porous paper is selected from Kraft paper, super-calendared Kraft paper, vellum newsprint stock, coated papers, wood-free papers, and papers made from recycled fiber.

27. A pressure-sensitive adhesive stock as claimed in claim 23 in which the paper is machine finished or machine glazed paper.

28. A pressure-sensitive adhesive stock as claimed in claim 23 in which porous paper is less than about a 50-pound per ream paper.

29. A pressure-sensitive adhesive stock as claimed in claim 23 in which the porous paper is about a 30-pound per ream paper.

30. A pressure-sensitive adhesive stock as claimed in claim 23 in which the resin component is selected from the group consisting of acrylic resins, ethylene-vinyl acetate resins, methacrylate resins, natural rubber, styrene resins, styrene acrylonitrile resins, styrene-butadiene resins, styrene-isoprene resins, chloroprene, and mixtures thereof.

31. A pressure-sensitive adhesive stock as claimed in claim 2 in which the resin component is selected from the group consisting of acrylic resins, ethylene-vinyl acetate resins, methacrylate resins, natural rubber, styrene resins, styrene-acrylonitrile resins, styrene-butadiene resins, styrene-isoprene resins, chloroprene, and mixtures thereof.

32. A pressure-sensitive adhesive stock suitable for conversion into labels which pressure-sensitive adhesive stock comprises a laminate of a face stock, a layer of pressure-sensitive adhesive in contact with a release surface of a release liner, said release liner formed of a paper substrate having thereon a release coating as the release surface for the pressure-sensitive adhesive, which release surface comprises a solid release coating which remains substantially on the paper substrate surface, said solid release coating comprised of a blend of a particulate resin component and a cured silicone polymer component, the cured silicone polymer component being present in an amount of from about 5 to about 40 percent by weight based on the weight of the cured silicone component and the particulate resin component and derived by hydrosilation cure of vinyl-addition silicone system comprising at least one vinyl silicone polymer and at least one silicone hydride crosslinker, said cure being catalyzed with a platinum catalyst, the resin component comprising resins having a glass transition temperature of from about $-125°$ C. to $100°$ C. and selected from the group consisting of acrylic resins, ethylene-vinyl acetate resins, methacrylate resins, natural rubber, styrene resins, styrene-acrylontrile resins, styrene-butadiene resins, styrene-isoprene resins, chloroprene, and mixtures thereof, said resins being essentially inert to the cure of the vinyl-addition silicone system, said release surface being derived from application of aqueous-based emulsion of the vinyl-addition silicone system and the particle resin component to the paper substrate surface followed by drying the emulsion and hydrosilation cure of the vinyl-addition silicone system, said paper substrate surface being a porous paper stock selected from the group consisting of Kraft paper newsprint, stock, coated papers, wood-free papers and papers made from recycled fiber and the coating on said paper substrate having a coat weight of from about 1 to about 10 $g/m_2$.

* * * * *

UNITED STATES PATENT AND TRADEMARK OFFICE
CERTIFICATE OF CORRECTION

PATENT NO. : 5,318,815
DATED : June 7, 1994
INVENTOR(S) : Charles W. Newing, et al.

It is certified that error appears in the above-indentified patent and that said Letters Patent is hereby corrected as shown below:

In the Drawings:

FIG. 6, Sheet 4 of 4, under the figure change "RELEASE SPEED (m)" to -- RELEASE SPEED (m/min) --.

Column 3, lines 40-42, delete "cross-linked density of cured silicon phase, and coat weight".
Column 3, line 49, before "component" insert -- (or silicon) --.
Column 3, line 65, change "-125" to -- -125° --.

Column 4, lines 2,3, after the paragraph ending with "particle size." insert the following paragraph which was omitted:
-- The precise amount of silicon present is dependent on particle size and nature of the dispersed particulate component and the desired release profile. For particles sufficiently soft at processing conditions to fill the voids between particle deformation, it is preferred for most applications that the amount of silicone provided be sufficient to surround all of such soft organic particles. Generally, amounts for a silicon system based on the 1571E/1572 silicon emulsions of Wacker Chemie, that which provides a silicon coat of at least about 90 Angstroms around each particle or about 180 Angstroms between particles. --

UNITED STATES PATENT AND TRADEMARK OFFICE
CERTIFICATE OF CORRECTION

PATENT NO. : 5,318,815
DATED : June 7, 1994
INVENTOR(S) : Charles W. Newing, et al.

It is certified that error appears in the above-indentified patent and that said Letters Patent is hereby corrected as shown below:

Column 4, line 16, change "air flow" to -- airflow --.
Column 4, line 44, after "stock;" delete "and".
Column 4, line 47, delete "adhesives." and insert therefor
-- adhesives; and
FIG. 6 illustrates release force in Newtons/meter as a function of release speed in meters per minute for three different vinyl addition silicon. --.

Column 4, line 57, after "which" change "gives" to -- give --.
Column 4, line 59, change "allowing" to -- allows --.
Column 5, line 19, change "inventions" to -- invention --.

Column 6, line 32, change "A Angstrons" to -- Angstroms --.

Column 7, line 55, change "air flow" to -- airflow --.
Column 7, line 59, before "dispersed" change "is" to -- are --.

Column 8, line 43, change "layflat" to -- lay-flat --.

Column 10, line 1, after "wherein" delete "at".

Column 10, line 4, before "additional" insert -- and --.
Column 10, line 62, change "rations" to -- ratios --.
Column 10, line 65, change "air flow" to -- airflow --.

UNITED STATES PATENT AND TRADEMARK OFFICE
CERTIFICATE OF CORRECTION

PATENT NO. : 5,318,815
DATED : June 7, 1994
INVENTOR(S) : Charles W. Newing, et al.

Page 3 of 4

It is certified that error appears in the above-indentified patent and that said Letters Patent is hereby corrected as shown below:

Column 11, line 17, change "rations" to -- ratios --.
Column 11, line 20, change "air flow" to -- airflow --.
Column 11, line 37, change "air flow" to -- airflow --.

Column 13, line 26, change "25C" to -- 25°C --.
Column 13, line 27, change "-32C" to -- -32°C --.
Column 13, line 29, change "-60C" to -- -60°C --.
Column 13, line 53, change "XVIX" to -- XIX --.

Column 14, line 65, change "Linar off" to
          -- Liner off --.

Column 15, line 16, change "XVIX" to -- XIX --.

In the Claims:

Column 16, line 62, delete "by converting".

Column 17, lines 11,12, change "particular" to
          -- particulate --.
Column 17, line 16, delete "by conversions".
Column 17, line 33, change "emulation" to
          -- emulsion --.
Column 17, line 35, change "emulations" to
          -- emulsions --.
Column 17, line 48, after "silicone" insert
          -- polymer --.
Column 17, line 62, after "paper" delete "stock".
Column 17, line 62, before "Kraft" insert
          -- the group consising of --.

UNITED STATES PATENT AND TRADEMARK OFFICE
CERTIFICATE OF CORRECTION

PATENT NO. : 5,318,815
DATED : June 7, 1994
INVENTOR(S) : Charles W. Newing, et al.

It is certified that error appears in the above-indentified patent and that said Letters Patent is hereby corrected as shown below:

```
Column 18, line 23, after "claim" insert -- 16 --.
Column 18, line 26, after  "paper" delete "stock".
Column 18, line 26, before "Kraft" insert
          -- the group consisting of --.
Column 18, line 68, change "resin" to -- polymer --.

Column 19, line 5, change "resin" to -- polymer --.
Column 19, line 11, before "Kraft" 1st occurrence insert
          -- the group consisting of --.
Column 20, line 37, change "10 g/m₂" to -- 10 g/m² --.
```

Signed and Sealed this

Twenty-fifth Day of April, 1995

Attest:

BRUCE LEHMAN

*Attesting Officer*   *Commissioner of Patents and Trademarks*